United States Patent Office 3,164,030
Patented Jan. 5, 1965

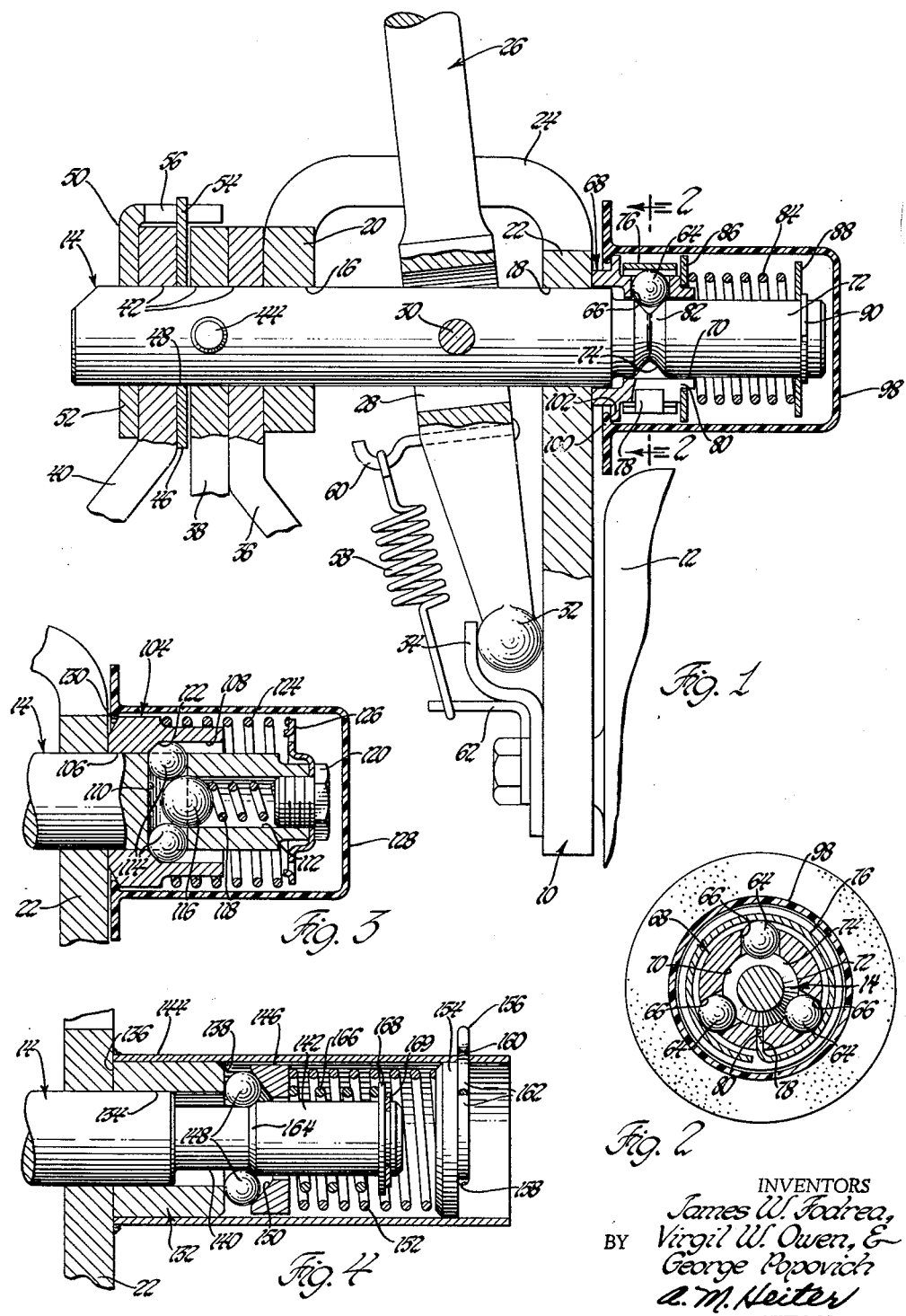

3,164,030
TRANSMISSION CONTROL
James W. Fodrea, Rochester, Virgil W. Owen, Madison Heights, and George Popovich, Birmingham, Mich., assignors to General Motors Corporation, Detroit, Mich., a corporation of Delaware
Filed Apr. 16, 1963, Ser. No. 273,454
20 Claims. (Cl. 74—476)

This invention relates to a transmission control and more particularly to a transmission control having a shift inhibitor.

This transmission control is adapted for controlling a four speed and reverse synchromesh transmission of the type shown in the assignee's copending application Ser. No. 451, now Patent No. 3,088,336, issued May 7, 1963, which is a continuation of assignee's abandoned application Ser. No. 699,714, filed November 29, 1957, for a Transmission, by James W. Fodrea, and is generally of a type of a transmission control as shown in assignee's Patent 2,922,315, Transmission Control, George H. Primeau. The transmission control employs a hand lever which may be moved laterally to select either the third-fourth shift lever or the first-second shift lever or the reverse shift lever and then rotated to actuate the lever selected. The hand lever is pivoted to a shaft so that lateral movement of the hand lever which has one end laterally fixed moves the shaft and rotary movement of the hand lever rotates the shaft. The shaft is connected selectively by a pin and slot connection to each of the shaft levers. A shift inhibitor assembly prevents inadvertent shifts to the reverse shift position and includes one shift inhibitor means which provides a normal force resisting movement of the shaft throughout its travel to the reverse position and another shift inhibitor means which provides a high force resisting initial movement of the shaft to the reverse shift position and after initial movement permits free movement to the reverse shift position. The one shift inhibitor means also acts to urge the shaft back to the first-second shift position but not beyond this position. The shift inhibitor assembly permits free movement of the shaft between the positions corresponding to selection of the first-second shift lever and the third-fourth shift lever.

An object of the invention is to provide an improved shift inhibitor assembly for a transmission control including shift inhibitor means providing a high initial force resisting initial movement of a shaft to a one shift position and after initial movement permitting free movement of the shaft to the one shift position.

Another object of the invention is to provide in a transmission control a shift inhibitor yieldingly resisting movement of a shaft to a shift position including, one spring providing a normal or low force resisting movement of the shaft to the shift position, a member received on the shaft and having an aperture and a ball received in the aperture and another spring prestressed to yieldingly hold the ball in a groove in the shaft so that as the shaft is shifted to the shift position the ball is forced up a ramp portion of the groove and out of the groove and onto the shaft whereafter movement of the shaft is resisted only by the one spring.

Another object of the invention is to provide in a transmission control a shift inhibitor for yieldingly resisting movement of a shaft to a shift position including, one spring providing a normal or low force resisting movement of the shaft to the shift position, a member received on the shaft and having a counterbore and a bore in the shaft and a ball disposed in the bore and yieldingly held in the counterbore and forced up a ramp portion of the counterbore and out of the counterbore and into the bore as the shaft is initially moved to the shift position whereafter movement of the shaft is resisted only by the one spring.

Another object of the invention is to provide a shift inhibitor for a transmission control resisting movement of a shaft to a shift position including, one spring providing a normal or low force resisting movement of the shaft to the shift position, a pair of annular members received on the shaft wherein one annular member is movable relative to the other, a groove on the shaft and a ball normally retained in the groove and yieldingly prevented from movement out of the groove by another spring yieldingly resisting movement of the annular members, the annular members being arranged such that as the shaft is moved to the shift position a ramp portion of the groove on the shaft urges the ball to bear against the other annular member and ride up a ramp on the one annular member and out of the groove onto a land of the shaft whereafter movement of the shaft to the shift position is resisted only by the one spring.

These and other objects of the invention will be more apparent from the following description and drawings of the preferred embodiments of the invention.

FIGURE 1 is an elevational cross-sectional view of the transmission control employing a shift inhibitor made in accordance with this invention.

FIGURE 2 is a section of FIGURE 1 on the line 2—2.

FIGURE 3 shows a modified form of the shift inhibitor shown in FIGURE 1.

FIGURE 4 shows another modified form of the shift inhibitor shown in FIGURE 1.

This transmission control is adapted to control four speed and reverse synchromesh transmissions of the type shown in the above-identified copending application Ser. No. 451. The transmission control assembly includes a support bracket 10, a hand lever 26 mounted on a shaft 14, shift levers 36, 38 and 40 and cap shaped bracket 50 as shown in Patent 2,922,315. U-shaped support bracket 10 may be mounted on a suitable suport 12 on the vehicle. Shaft 14 is axially and slidably mounted in aligned apertures 16 and 18 in the legs 20 and 22 respectively of support bracket 10 and the support bracket 10 has a large central aperture 24 in which hand lever 26 is located. The hand lever 26 has an aperture 28 centrally located in the lever fitting around the shaft 14 and is connected to the shaft by a pin 30 for lateral pivotal movement while being rotatably fixed to the shaft. The fulcrum end of the lever 26 has a ball 32 located in an arcuate guide formed by a guide member 34 and the support bracket 10. The guide member 34 has an arcuate shape having a center coinciding with the center of shaft 14 and provides a fixed fulcrum for lateral pivotal movement of the lever 26 to move the shaft 14 axially while permitting rotary movement of the lever 26 with the shaft 14.

Transmission control is effected through suitable linkage connections between the transmission to be controlled and the third-fourth shift lever 36, first-second shift lever 38 and reverse shift lever 40. Each of the shift levers 36, 38 and 40 has a central aperture 42 fitting the shaft 14 to rotatably mount the shift levers on the shaft and a transverse slot, not shown, which fits a pin 44 secured in the shaft 14. Thus, when the pin 44 is located in the slot of any one of the shift levers and the hand lever 26 is rotated, that shift lever is rotated. Between the lever 40 and the lever 38 there is disposed an interlock plate 46 having a central aperture 48 fitting the shaft 14. The shift levers and interlock plate are held in position on the shaft by the cap shaped bracket 50 having an end portion 52 adjacent the outer lever 40 and holding the interlock plate 46 and levers 40, 38 and 36 against lateral movement relative to the shaft. The bracket 50 is connected to the leg 20 of the support bracket 10 by two side wall portions, not shown, extending from the end portion 52 which are secured to the leg 20. Interlock plate 46 has a radially extending portion 54 extending beyond the upper ends of the shift levers and the bracket 50 has a laterally extending tongue 56 received in a slot in portion 54 to prevent rotary movement of the interlock plate 46. Interlock plate 46 has a transverse slot, not shown, similar to the transverse slots in the levers 40, 38 and 36 so that the slots in levers 40 and 38 must be aligned with the slot in interlock plate 46 to permit the pin 44 to pass through the slot in interlock plate 46.

The interlock plate 46 has been provided because the transmission to which the shift levers are to be connected has no internal interlock between the reverse and first-second speed ratio selectors in the transmission. However, the interlock plate would not be necessary where an internal interlock is provided in the transmission between the reverse and first-second speed ratio selectors. Because the transmission to which the shift levers are to be connected has an internal interlock between the first-second and third-fourth speed ratio selectors in the transmission, it is not necessary that there be provided an interlock between the levers 38 and 36. In transmissions having no internal interlock between the first-second and third-fourth speed ratio selectors, an interlock member such as interlock plate 46 would be provided between the levers 38 and 36.

To prevent rattling of the hand lever 26 after an operator has released his grip on the lever 26, there is provided a spring 58 secured at its one end to the lower end of the hand lever 26 by a hooked pin 60 and at the other end by an attaching member 62 which is secured to the support bracket 10. Spring 58 is prestressed and normally urges the ball 32 of hand lever 26 against the support bracket 10 in all positions to which the shaft 14 is laterally moved and rotated.

The transmission control assembly is provided with a reverse shift inhibitor to resiliently resist movement of shaft 14 to a reverse shift position corresponding to selection of the reverse lever 40. One reverse shift inhibitor assembly as shown in FIGURES 1 and 2 employs shift inhibitor means comprising a detent or ball 64 freely mounted in each of three circumferentially spaced radial bores 66 in an annular member 68. The annular member 68 has a central aperture 70 freely fitting a reduced cylindrical end portion 72 of the shaft 14 which extends beyond the leg 22 of support bracket 10. With the shaft 14 in a first-second shift position corresponding to selection of the first-second shift lever 38 as shown in FIGURE 1, the balls 64 are retained in a V-groove 74 in cylindrical end portion 72. A circular band spring 76 is received externally of the member 68 and at one end has a tang 78 received in a slot 80 in member 68 to hold spring 76 in position. The axial length of bores 66 is less than the diameter of balls 64 and the spring 76 is prestressed to yieldingly hold balls 64 in groove 74 and provides a force resisting radial movement of balls 64 out of groove 74. Member 68 is at one end in abutting relationship with leg 22 and upon initial movement of the shaft 14 to the reverse shift position, the ramp or side wall 82 of groove 74 urges the balls 64 against the side walls of the bores 66 whereupon the balls are forced to ride up the ramp 82 of the groove, further into the bores 66 and onto the cylindrical end portion 72 whereafter the spring loaded balls 64 ride along end portion 72 of the shaft and permit free movement of the shaft as the shaft is continued to be moved to the reverse shift position. Thus, there is provided a high force by the spring loaded balls resisting initial movement of the shaft from the first-second shift position to the reverse shift position to prevent inadvertent shifts to reverse and after initial movement, that is, with the balls 64 fully out of the groove 74 and on the cylindrical end portion 72, the spring loaded balls ride along the cylindrical end portion 72 as shaft 14 is continued to be moved to the reverse shift position and do not resist movement of the shaft.

In addition to the high initial force provided by the spring loaded detents or balls 64, there is provided shift inhibitor means comprising a coil spring 84 received on the end portion 72 and in abutting relationship at its opposite ends with a pair of abutment rings 86 and 88. The ring 86 is in abutting relationship with annular member 68 and the ring 88 is in abutting relationship with a retainer or snap ring 90 which is held in a ring groove in the end portion 72. With the shaft in the first-second shift position as shown in FIGURE 1, the spring 84 is in an unstressed condition and upon movement of the shaft to the reverse shift position, the spring 84 is compressed between the rings 86 and 88 and provides a normal or low force smaller in magnitude than the high initial force provided by the spring loaded balls 64. The spring 84 acts to yieldingly resist movement of the shaft throughout movement of the shaft from the first-second shift position to the reverse shift position to further safeguard against inadvertent shifts to reverse and also acts to urge the shaft back to the first-second shift position but not beyond this position. The spring 84 does not resist movement of the shaft between the first-second shift position and the shift position corresponding to selection of the third-fourth shift lever 36.

Upon movement of the shaft back to the first-second shift position, the balls 64 ride along the cylindrical end portion 72 until they meet with groove 74 whereupon they are urged into groove 74 by spring 76 and yieldingly held in place. Upon movement of the shaft from the first-second shift position to the third-fourth shift position, the member 68 is prevented from movement relative to the shaft by the spring loaded balls held in the groove and moves conjointly with the shaft because the spring 84 is in a continuously relaxed position in the first-second and third-fourth shift positions and therefore does not resist movement of member 68 with the shaft. A protective rubber boot 98 completely encloses the reverse shift inhibitor assembly and is retained in position by a lip portion 100 which is slipped over an annular flange 102 integral with member 68. Boot 98 retains lubricant in the reverse shift inhibitor assembly and protects the shift inhibitor assembly from foreign elements. Fabrication of the transmission control assembly and the above shift inhibitor assembly is facilitated at final assembly because the above shift inhibitor assembly may be added as a subassembly to the transmission control assembly and does not need to be secured to the support bracket.

The modified reverse shift inhibitor shown in FIGURE 3, which also illustrates the shaft in the first-second shift position, employs shift inhibitor means comprising an annular member 104 abutting the leg 22 having a central aperture 106 freely fitting one end of shaft 14 which extends beyond the leg 22. Member 104 has a counterbore 108 and the shaft 14 has a radial bore 110 and an axial bore 112 intersecting the radial bore 110 and extending through the one end of the shaft, the bore 112 being larger in diameter than bore 110. Two detents or balls 114 are freely mounted in bore 110 and a ball 116 larger in diameter than balls 114 is freely mounted in bore 112 and arranged to contact each of balls 114. A spring 118 is positioned in bore 112 and has its opposite ends in abutting relationship with the ball 116 and plug 120 which is threadably received in the one end of the bore 112. The spring 118 is prestressed by adjustment of plug 120 and urges the ball 116 into the bore 110 whereupon the balls 114 are urged apart and radially outward and into the counterbore 108. When the shaft is initially moved from the first-second shift position to the reverse shift position, the side wall of the bore 110 urges the balls 114 against the ramp or flat side wall 122 of the counterbore 108 whereupon the balls 114 are forced to ride up the ramp 122, out of the counterbore 108 and further into the bore 110. As the balls 114 are driven inwardly into the bore 110 by the ramp 122, they in turn urge the larger ball 116 further into the bore 112 and against the spring 118. When the balls 114 are fully out of the counterbore 108, the shaft is thereafter permitted to move freely to the reverse shift position by the spring loaded balls 114 which then ride along the counterbore 108.

In addition to the detent feel provided by the spring loaded balls 114 and ball 116, there is provided shift inhibitor means comprising a coil spring 124 received on the one end of shaft 14 and in abutting relationship at its opposite ends with the annular member 104 and an abutment member 126 which is secured by the plug 120 to the one end of the shaft. With the shaft in the first-second shift position as shown in FIGURE 3 and the spring 118 prestressed by adjustment of plug 120, the spring 124 is in an unstressed condition and upon movement of the shaft to the reverse shift position, the spring 124 is continuously compressed and provides a normal or low force smaller in magnitude than the high initial force provided by the spring loaded balls 114. Thus, there is provided a high initial force by the spring loaded balls 114 resisting initial movement of the shaft from the first-second shift position to the reverse shift position and thereafter there is provided a normal or low force by the spring 124 resisting further movement of the shaft to the reverse shift position. The spring 124 provides added detent feel and also acts to urge the shaft back to the first-second shift position but not beyond this position.

Upon movement of the shaft back to the first-second shift position, the spring loaded balls 114 are urged back into the counterbore 108 and upon movement from the first-second shift position to the third-fourth shift position, the spring loaded balls 114 ride along the axial length of counterbore 108 and thus do not resist movement of the shaft from the first-second shift position to the third-fourth shift position. A rubber boot 128 similar to the boot 98 shown in FIGURE 1 encloses the shift inhibitor assembly and has a lip portion 130 for securing the boot 128 to the member 104. The above shift inhibtor assembly may be added as a subassembly to the transmission control assembly by mounting the shift inhibitor means on the one end of the shaft, it not being necessary to secure the shift inhibitor assembly to the support bracket.

The modified shift inhibitor shown in FIGURE 4, which illustrates the shaft 14 in the first-second shift position, employs shift inhibitor means comprising an annular member 132 having a central aperture 134 freely fitting one end of the shaft 14 which extends beyond the leg 22 of the support bracket. The member 132 has one end face 136 in abutting relationship with the leg 22 and another end face 138 lying on a plane perpendicular to the axis of the shaft. Shaft 14 at the one end has a groove 140 and a reduced end portion or land 142 which has a diameter smaller than the diameter of the shaft. The member 132 is received internally of a cylindrical cage member 144 which is welded to leg 22. A movable annular member 146 is slidably received on the shaft and mounted internally of cage member 144. A plurality of detents or balls 148 rests in the groove 140 and within a ball race which is defined by the end face 138 of member 132 and a ramp portion 150 of movable member 146. A coil spring 152 is mounted in one end of cage member 144 and at its opposite ends is in abutting relationship with the movable mmeber 146 and a plug member 154. Plug member 154 is fitted in the one end of cage member 144 and is in abutting relationship with a cotter pin 156 which has its main body portion 160 and its two depending fingers 162 received in three apertures 158 circumferentially spaced about cage member 144 to secure the cotter pin in position. With the shaft in the first-second shift position as shown in FIGURE 4, the spring 152 is normally prestressed and the ramp portion 150 of movable member 146 in cooperation with the end face 138 of member 132 cams the balls 148 inwardly and yieldingly prevents movement of the balls 148 out of the groove 140. By varying the thickness of plug member 154, the prestressing of spring 152 can be varied to provide the desired detent feel by the spring loaded balls 148.

Upon movement of the shaft to the reverse shift position, the ramp or side wall 164 of the groove 140 urges the balls 148 against the end face 138 whereupon the balls are forced to ride up the ramp 164 and also the ramp portion 150 of movable member 146, the balls 148 being restricted to movement along their vertical center line. Once the balls are over the ramp 164, the balls thereafter ride along the land 142 as the shaft is continued to be moved to the reverse shift position. Thus, there is provided a high initial force by the spring loaded balls resisting initial movement of the shaft from the first-second shift position to the reverse shift position and after initial movement the spring loaded balls permit free movement of the shaft to the reverse shift position.

In addition to the detent feel provided by spring loaded balls 148, there is provided shift inhibitor means comprising a coil spring 166 which is received on the reduced end portion 142 of shaft 14 and in abutting relationship at its opposite ends with member 146 and a ring 168. Ring 168 is in abutting relationship with a retainer or snap ring 169 which is held in a ring groove in the reduced end portion 142. With the shaft in the first-second position as shown in FIGURE 4, the spring 166 is in an unstressed condition and upon movement of the shaft to the reverse shift position, the spring 166 is continuously compressed and provides a normal or low force smaller in magnitude than the high initial force provided by the spring loaded balls 148. Spring 166 provides added detent feel and also acts to urge the shaft back to the first-second shift position but not beyond this position.

Upon movement of the shaft back to the first-second position, the balls 148 ride along the land 142 until they meet with groove 140 whereupon they are urged into the groove 140 by the spring urged member 146 acting in cooperation with the end face 138 of member 132. The axial length of the groove 140 is such that when the shaft is moved from the first-second shift position to the third-fourth shift position, the balls 148 ride along the length of groove 140 and thus movement of the shaft to the third-fourth shift position is not resisted by the spring loaded balls. The above shift inhibitor assembly may be added as a subassembly to the transmission control assembly by mounting the shift inhibitor assembly on the one end of the shaft and then securing the cage member of the shift inhibitor assembly to the support bracket.

All of the above shift inhibitor assemblies because they may be added as a subassembly to the transmission control assembly at the final stage in assembly are highly advantageous in mass production where ease of assembly contributes to considerable time saving and decreased costs.

The above-described embodiments are illustrative of the invention which may be modified by those skilled in the art within the scope of the appended claims.

We claim:
1. In a transmission control,
  (A) support means,
  (B) a shaft rotatably and axially slidably mounted in said support means,
  (C) means for axially moving said shaft between a plurality of shift positions,
  (D) first shift inhibitor means providing a low force resisting movement of said shaft in one axial direction from one to another of said plurality of shift positions,
  (E) and second shift inhibitor means providing a high force resisting initial movement of said shaft from one shift position to said another shift position and after initial movement permitting relatively free movement to said another position.

2. In a transmission control as defined in claim 1,
  (1) said second shift inhibitor means including a member having an annular portion received on said shaft and means for preventing movement of said member relative to said support means when said shaft is moved in said one axial direction from said one to said another shift position, (2) said shaft having a groove providing a ramp, (3) said member having an aperture and a ball mounted in said aperture, (4) said groove disposed axially on said shaft relative to said aperture so that said ball is normally retained in said groove when said shaft is in said forward shift position, (5) and spring means prestressed to provide a high force resisting movement of said ball out of said groove whereby said ramp upon initial movement of said shaft from said one shift position to said another shift position urges said ball to ride up said ramp and out of said groove so that said ball thereafter permits relatively free movement of said shaft to said another shift position.

3. A transmission control as defined in claim 1, (1) said second shift inhibitor means including a member having an annular portion received on said shaft and means for preventing movement of said member relative to said support means when said shaft is moved in said one axial direction from said one to said another shift position, (2) said shaft having an aperture and a ball mounted in said aperture, (3) said member having a counterbore providing a ramp, (4) said aperture disposed axially in said shaft relative to said counterbore so that said ball is normally retained in said counterbore when said shaft is in said one shift position, (5) and spring means carried by said shaft prestressed to provide a force resisting movement of said ball out of said counterbore whereby said ramp upon initial movement of said shaft from said one shift position to said another shift position urges said ball to ride up said ramp and out of said counterbore so that said ball thereafter permits relatively free movement of said shaft to said another shift position.

4. In a transmission control as defined in claim 1, (1) said second shift inhibitor means including a first member having an annular portion received on said shaft and means for preventing movement of said first member relative to said support means when said shaft is moved in said one axial direction from said one to said another shift position, (2) said shaft having a groove providing a first ramp, (3) said first member having an end face, (4) a second member having an annular portion received on said shaft and a second ramp adjacent the end face of said first member and axially movable relative to said first annular member and shaft, (5) a ball retained in said groove and disposed between said end face and said second ramp when said shaft is in said one shift position, (6) and spring means prestressed to urge said second member in said one axial direction so that said second ramp forces said ball against said end face and said second ramp and end face conjointly act to yieldingly hold said ball in said groove whereby said first ramp upon initial movement of said shaft from said one shift position to said another shift position urges said ball to bear against said end face and ride up said first and second ramps and out of said groove so that said ball thereafter permits relatively free movement of said shaft to said another shift position.

5. In a transmission control, (A) support means, (B) a shaft rotatably and axially slidably mounted in said support means, (C) means for axially moving said shaft between a plurality of shift positions, (D) shift inhibitor means providing a high initial force resisting initial movement of said shaft in one axial direction from one of said shift positions to another of said shift positions, (E) said shift inhibitor means including a pair of detent contacting means each having a side wall, (F) one of said detent contacting means being axially movable with said shaft and means for preventing movement of the other of said detent contacting means relative to said support means when said shaft is moved in said one axial direction from said one to said another shift position, (G) detent means contactable with said detent contacting means and capable of movement along said side walls, (H) spring means yieldingly resisting movement of said detent means along said side walls, (I) and said side walls of said one and other detent contacting means being inclined relative to each other and positioned axially relative to each other so that when said shaft is moved in said one axial direction from said one shift position to said another shift position said detent means is contacted by the side wall of said one detent contacting means and urged into contact with the side wall of said other detent contacting means whereby said side walls conjointly squeeze said detent means and move said detent means along said side walls to a point where said side walls are permitted to move freely relative to each other unaffected by said detent means and said shaft is relatively free to move to said another shift position.

6. In a transmission control as defined in claim 5, (1) wherein the side wall of said one detent contacting means is formed by an annular groove in said shaft, (2) the side wall of said other detent contacting means is a side wall portion formed by each of a plurality of apertures in said other detent contacting means, (3) and said detent means is a ball mounted in each of said plurality of apertures and normally yieldingly retained in said groove by said spring means when said shaft is in a shift position other than said another shift position.

7. In a transmission control as defined in claim 5, (1) wherein the side wall of said one detent contacting means is a side wall portion formed by a radial bore through said shaft, (2) the side wall of said other detent contacting means is formed by a counterbore in said other detent contacting means, (3) and said detent means is a pair of balls mounted in said radial bore and urged by said spring means in an opposite radial direction relative to each other so that each of said balls is normally retained in said counterbore when said shaft is in a shift position other than said another shift position.

8. In a transmission control as defined in claim 5, (1) wherein the side wall of said one detent contacting means is formed by an annular groove in said shaft, (2) the side wall of said other detent contacting means is an end face on said detent contacting means, (3) said detent means is a plurality of balls normally retained in said annular groove when said shaft is in a shift position other than said another shift position, (4) a member having an annular portion slidably received on said shaft and a ramp portion adjacent said end face and abutting said balls, (5) and said spring means being arranged to urge said annular member in said one axial direction so that said ramp portion and end face conjointly squeeze said balls and yieldingly resist movement of said balls out of said annular groove.

9. In a transmission control,
(A) support means,
(B) a shaft rotatably and axially slidably mounted in said support means,
(C) means for axially moving said shaft between a plurality of shift positions,
(D) shift inhibitor means providing a high initial resisting force resisting initial movement of said shaft in one axial direction from one of said shift positions to another of said shift positions and after initial movement permitting relatively free movement of said shaft to said another shift position,
(E) said shift inhibitor means including an abutment member and means for preventing movement of said abutment member relative to said support means when said shaft is moved in said one axial direction from said one to said another shift position,
(F) said shaft having detent retaining means including a side wall,
(G) said abutment member having a side wall adjacent the side wall of said shaft,
(H) detent means received by said detent retaining means,
(I) said side walls being disposed relative to said detent means such that when said shaft is initially moved in said one axial direction to said one shift position said side walls conjointly contact and axially squeeze said detent means forcing said detent means to move along said side walls,
(J) said detent means being moved along said side walls to a point where said detent means loses contact with one of said side walls whereafter said shaft is permitted to move relatively freely by said detent means to said one shift position,
(K) and spring means prestressed to provide a high resisting force resisting movement of said detent means along said side walls.

10. In a transmission control,
(A) support means,
(B) a shaft rotatably and axially slidably mounted in said support means,
(C) means for axially moving said shaft between a plurality of shift positions including a forward and a reverse shift position,
(D) shift inhibitor means providing a high initial resisting force resisting initial movement of said shaft in one axial direction from said forward shift position to said reverse shift position and after initial movement permitting free movement of said shaft to said reverse shift position,
(E) said shift inhibitor means including a member having an annular portion slidably received on said shaft and means for preventing movement of said member relative to said support means when said shift is moved in said one axial direction from said forward to reverse shift position,
(F) said shaft having detent retaining means including a side wall,
(G) said member having a side wall adjacent the side wall of said shaft,
(H) detent means received by said detent retaining means,
(I) spring means prestressed to urge said detent means into contact with one of said side walls when said shaft is in said forward shift position,
(J) the other of said side walls being arranged relative to said one side wall so that when said shaft is initially moved in said one axial direction from said forward shift position to said reverse shift position said one side wall urges said detent means against said other side wall and said side walls acting together force said detent means along said side walls,
(K) said spring means providing a force resisting movement of said detent means along said side walls,
(L) and said detent means being movable along said side walls to a point where said side walls no longer conjointly contact said detent means whereafter said shaft is relatively free to move to said reverse shift position unaffected by said detent means.

11. In a transmission control,
(A) support means,
(B) a shaft rotatably and axially slidably mounted in said support means,
(C) means for axially moving said shaft between a plurality of shift positions,
(D) first shift inhibitor means including first spring means providing a force resisting movement of said shaft in one axial direction from one of said shift positions to another of said shift positions,
(E) second shift inhibitor means providing a high initial force resisting initial movement of said shaft in said one axial direction from said one to said another shift positions,
(F) said second shift inhibitor means including a pair of detent contacting means each having a side wall,
(G) one of said detent contacting means being axially movable with said shaft and means for preventing movement of the other of said detent contacting means relative to said support means when said shaft is moved in said one axial direction from said one to said another shift position,
(H) detent means contactable with said side walls and capable of movement along said side walls,
(I) second spring means prestressed to yieldingly resist movement of said detent means along said side walls,
(J) and said side walls inclined relative to each other and positioned axially relative to each other so that when said shaft is initially moved in said one axial direction from said one to said another shift position said detent means is contacted by the side wall of said one detent contacting means and urged into contact with the side wall of said other detent conacting means whereupon said side walls cooperatively move said detent means along said side walls to a point where said side walls are permitted to move relative to each other relatively unaffected by said detent means whereafter movement of said shaft to said another shift position is resisted solely by the force of said first spring means.

12. In a transmission control as defined in claim 11,
(1) wherein the side wall of said one detent contacting means is formed by an annular groove in said shaft,
(2) the side wall of said other detent contacting means consists of a side wall portion formed by each of a plurality of apertures in said other detent contacting means,
(3) and said detent means is a ball mounted in each of said plurality of apertures and normally yieldingly retained in said groove by said second spring means when said shaft is in a shift position other than said another shift position.

13. In a transmission control as defined in claim 11,
(1) wherein the side wall of said one detent contacting means is a side wall portion formed by a radial bore in said shaft,
(2) the side wall of said other detent contacting means is formed by a counterbore in said other detent contacting means,
(3) and said detent means is a pair of balls mounted in said radial bore and urged by said second spring means in an opposite radial direction relative to each other so that each of said balls is normally retained in said counterbore when said shaft is in a shift position other than said another shift position.

14. In a transmission control as defined in claim 11,
(1) wherein the side wall of said one detent contacting means is formed by an annular groove in said shaft,
(2) the side wall of said other detent contacting means is an end face on said detent contacting means, (3) said detent means is a plurality of balls normally retained in said annular groove when said shaft is in a shift position other than said another shift position,
(4) a member having an annular portion slidably received on said shaft and a ramp portion adjacent said end face and abutting said balls,
(5) and said second spring means being arranged to urge said member in said one axial direction so that said ramp portion and end face conjointly squeeze said balls and yieldingly resist movement of said balls out of said annular groove.

15. In a transmission control,
(A) support means,
(B) a shaft rotatably and axially slidably mounted in said support means,
(C) means for axially moving said shaft between a plurality of shift positions including movement in one axial direction from a first to a second shift position,
(D) annular abutment means received on said shaft having an end portion abuttable with said support means to prevent movement of said annular abutment means relative to said support means when said shaft is moved in said one axial direction from said first to said second shift position,
(E) an abutment carried on said shaft prevented against movement relative to said shaft in the other axial direction,
(F) a first spring,
(G) said annular abutment means and the abutment carried on said shaft engaging the opposite ends of said first spring,
(H) said first spring being in an unstressed condition when said shaft is in said first shift position and compressed between said annular abutment means and the abutment on said shaft when said shaft is moved to said second shift position to provide a force resisting movement of said shaft to said second shift position,
(I) an annular groove in said shaft providing a ramp,
(J) said annular abutment means having an aperture providing a side wall and a ball mounted in said aperture and retained by said groove when said shaft is in said first shift position,
(K) a second spring prestressed to normally urge said ball against said ramp and providing a force resisting movement of said ball up said ramp and out of said groove,
(L) and said ramp upon initial movement of said shaft from said first shift position to said second shift position forcing said ball to bear against the side wall of said aperture and ride up said ramp and out of said groove so that the movement of said shaft subsequent to initial movement to said second shift position is resisted solely by said first spring.

16. In a transmission control,
(A) support means,
(B) a shaft rotatably and axially slidably mounted in said support means,
(C) means for axially moving said shaft between a plurality of shift positions including a reverse, a first forward and a second forward shift position,
(D) an abutment member having an aperture fitting said shaft to axially slidably mount said abutment member on said shaft,
(E) means for preventing movement of said abutment member relative to said support means when shaft is moved in one axial direction from said first forward to said reverse shift position,
(F) abutment means carried on said shaft and prevented against movement relative to said shaft in the other axial direction,
(G) a first spring having its opposite ends abutting said abutment member and abutment means and being in an unstressed condition when said shaft is in said first and second forward shift positions and compressed between said abutment member and abutment means when said shaft is moved to said reverse shift position whereby said first spring provides a force resisting movement of said shaft to said reverse shift position and permits relatively free movement of said shaft from said reverse shift position to said first forward and second forward shift positions,
(H) an annular groove in said shaft providing a pair of ramps,
(I) a plurality of circumferentially spaced bores in said abutment member extending radially from the axis of said shaft,
(J) said plurality of bores having side walls,
(K) said plurality of bores being located opposite said annular groove when said shaft is in said first forward shift position,
(L) a ball mounted in each of said plurality of bores and a second spring carried by said abutment member prestressed to yieldingly hold said balls in said annular groove and against said ramps when said shaft is in said first forward position and providing a force resisting movement of said balls out of said annular groove,
(M) one of said ramps upon initial movement of said shaft in said one axial direction from said first forward shift position to said reverse shift position urging said balls to bear against the side walls of said plurality of bores and ride up and over said ramp and out of said annular groove against the force of said second spring and onto said shaft,
(N) said balls thereafter riding relatively freely along said shaft upon further movement of said shaft to said reverse shift position,
(O) and the other of said ramps upon movement of said shaft from said first forward shift position to said second forward shift position urging the yieldingly held balls to bear against the side walls of said plurality of bores whereby said abutment member and shaft move conjointly to said second forward shift position.

17. In a transmission control as defined in claim 16 wherein said annular groove is a V-shaped groove and said second spring is a circular band spring received externally of said abutment member arranged to yieldingly resist outward radial movement of each of said plurality of balls and means to retain said circular band spring on said abutment member.

18. In a transmission control,
(A) support means,
(B) a shaft rotatably and axially slidably mounted in said support means,
(C) means for axially moving said shaft between a plurality of shift positions including movement in one axial direction from a first shift position to a second shift position,
(D) abutment means having an annular portion slidably received on said shaft and prevented against movement in said one axial direction by said support means when said shaft is moved from said first to said second shift position,
(E) the annular portion of said abutment means having a counterbore providing a first side wall including a ramp portion,
(F) said shaft having a radial bore,
(G) a pair of balls mounted in said bore and retained in said counterbore when said shaft is in said first shift position,
(H) a first spring carried by said shaft,
(I) said first spring being prestressed and arranged so that each of said balls is urged against said ramp portion of said abutment means when said shaft is in said first shift position and providing a force resisting movement of said balls out of said counterbore, (J) said ramp portion upon initial movement of said shaft from said first shift position to said second shift position forcing said balls out of said counterbore and into said radial bore to permit said shaft to move thereafter to said second shift position relatively unaffected by the force of said first spring, (K) and a second spring providing a force resisting movement of said shaft from said first shift position to said second shift position.

19. In a transmission control, (A) support means, (B) a shaft rotatably and axially slidably mounted in said support means, (C) means for axially moving said shaft between a plurality of shift positions, (D) an abutment member having an annular portion received on said shaft and movable along said shaft to contact with said support means, (E) abutment means on said shaft, (F) a first spring, (G) said abutment member and abutment means in abutting relationship with the opposite ends of said first spring so that when said shaft is moved in one axial direction to one of said plurality of positions said abutment member is urged against said support means and said first spring is compressed and provides a force resisting movement of said shaft in said one axial direction, (H) said annular portion having a counterbore providing an inclined wall portion, (I) said shaft having a radial bore and an axial bore of larger diameter than said radial bore communicating with said radial bore, (J) a ball mounted in said axial bore, (K) a pair of balls mounted in said radial bore of smaller diameter than the ball mounted in said axial bore, (L) the ball in said axial bore being movable to enter said radial bore to contact each of said pair of balls and move said pair of balls apart, (M) an adjustable plug threadably received in one end of said axial bore, (N) a second spring mounted in said axial bore having its opposite ends in abutting relationship with the ball in said axial bore and said adjustable plug, (O) and said second spring being prestressed to normally urge the ball in said axial bore to enter said radial bore and force each of said pair of balls radially outward into said counterbore so that upon movement of said shaft in said one axial direction to said one position the pair of balls in said counterbore are forced to ride up said inclined wall portion out of said counterbore and into said radial bore.

20. In a transmission control, (A) support means, (B) a shaft rotatably and axially slidably mounted in said support means, (C) means for axially moving said shaft between a plurality of shift positions including movement of said shaft in one axial direction from one of said shift positions to another of said shift positions, (D) an annular cage member received on said shaft and fixed to said support means, (E) an annular abutment member slidably received on said shaft and disposed internal of said annular cage member, (F) said annular abutment member having its one end in abutting relationship with said support means to prevent movement of said annular abutment member in said one axial direction when said shaft is moved from said one to said another shift position, (G) an annular member slidably received on said shaft and having a ramp portion adjacent the other end of said annular abutment member, (H) said shaft having an annular groove providing a second ramp portion, (I) a plurality of balls normally retained in said annular groove and contacting said ramp portions and said other end of said annular abutment member, (J) a plug member received in said cage member and means for preventing movement of said plug member in the other axial direction relative to said cage member, (K) and a spring having its opposite ends in abutting relationship with said annular member and plug member and prestressed so that said first ramp portion and said other end of said annular abutment member conjointly squeeze said balls and hold said balls in said annular groove whereby when said shaft is moved in said one axial direction from said one shift position to said another shift position said balls are forced to ride up said first and second ramp portions and out of said annular groove against the spring force of said spring so that said shaft is permitted thereafter to move to said another shift position relatively unaffected by the spring force of said spring.

References Cited in the file of this patent
UNITED STATES PATENTS

| | | |
|---|---|---|
| 1,379,891 | Aichele | May 31, 1921 |
| 1,920,038 | Thomas et al. | July 25, 1933 |
| 1,951,876 | Lapsley | Mar. 20, 1934 |
| 1,986,860 | Snow et al. | Jan. 8, 1935 |
| 3,015,968 | Szekely | Jan. 9, 1962 |